United States Patent [19]

Inoue

[11] 4,350,863
[45] Sep. 21, 1982

[54] HIGH-FREQUENCY POWER FEEDER CIRCUITRY AND SUPPLY FOR ELECTRICAL DISCHARGE MACHINING

[75] Inventor: Kiyoshi Inoue, Tokyo, Japan
[73] Assignee: Inoue-Japax Research Incorporated, Yokohama, Japan
[21] Appl. No.: 158,124
[22] Filed: Jun. 10, 1980

Related U.S. Application Data

[63] Continuation-in-part of Ser. No. 16,423, Mar. 1, 1979, Pat. No. 4,277,668.

[30] Foreign Application Priority Data

Mar. 7, 1978 [JP] Japan .................................. 53-26332
Jun. 13, 1979 [JP] Japan .................................. 54-73542

[51] Int. Cl.³ ............................................. B23P 1/08
[52] U.S. Cl. .............................. 219/69 P; 219/69 M; 219/69 C
[58] Field of Search ................ 219/69 P, 69 M, 69 C, 219/69 S, 69 R; 340/147 F

[56] References Cited

U.S. PATENT DOCUMENTS

| | | | |
|---|---|---|---|
| 2,951,142 | 8/1960 | Ullmann | 219/69 C |
| 3,348,015 | 10/1967 | Rhyner et al. | 219/69 C |
| 3,558,842 | 1/1971 | Livshits et al. | 219/69 P |
| 3,614,368 | 10/1971 | Lobur | 219/69 P |
| 3,777,108 | 12/1973 | Maillet | 219/69 C |
| 3,879,596 | 4/1975 | Verner | 219/69 P |
| 3,943,321 | 3/1976 | Pfau et al. | 219/69 M |

FOREIGN PATENT DOCUMENTS 403523 3/1974 U.S.S.R. .............................. 219/69 P

*Primary Examiner*—B. A. Reynolds
*Assistant Examiner*—M. H. Paschall
*Attorney, Agent, or Firm*—Karl F. Ross

[57] ABSTRACT

An EDM method and apparatus for supplying successive trains of discrete elementary machining pulses to an EDM gap wherein a high-frequency AC power generally of the frequency of the discrete elementary machining pulses is generated in a high-frequency generating unit disposed remote from the machining gap. The power is transmitted directly in the unrectified AC form along a feeder cable to the proximity of the machining gap whereat a switching rectifier is provided connected to a tool electrode and workpiece across the machining gap via respective conductors of a minimum length. The rectifier operates to cyclically interrupt the transmitted high-frequency AC while concurrently rectifying same, thereby providing successive trains of the discrete elementary machining pulses for direct application across the EDM gap. A discharge state sensor is also disposed in the direct proximity of the gap for sensing the discharge characteristics occurring in the EDM operation a pulser provides a control signal which acts on pulsing for the switching rectifier to modify the cyclic interruption of the transmitted AC and to control production of the successive trains of elementary discharge pulses.

16 Claims, 2 Drawing Figures

HIGH-FREQUENCY POWER FEEDER CIRCUITRY AND SUPPLY FOR ELECTRICAL DISCHARGE MACHINING

CROSS-REFERENCE TO RELATED APPLICATION

This application is a continuation-in-part of my copending U.S. patent application Ser. No. 016,423 filed 1 Mar. 1979; now U.S. Pat. No. 4,277,668 issued 7 July 1981.

FIELD OF THE INVENTION

The present invention relates to a high-frequency power feeder circuitry and supply method for electrical discharge machining (EDM). More particularly, the invention concerns a method of and apparatus for supplying high-frequency electrical discharge machining pulses between a tool electrode and a workpiece across a machining gap which is flushed with a machining (dielectric) liquid in an electrical discharge machine.

BACKGROUND OF THE INVENTION

An electrical discharge machine is commonly equipped with a power supply for providing high-frequency machining pulses to the dielectric filled machining gap formed between the tool electrode and the workpiece in a dielectric containing or collecting work vessel. In conventional EDM power supply circuit arrangements and methods, machining power pulses are produced in a unit (power supply unit) provided separately from the machine proper which carries mechanical components and the work vessel in which the machining gap is defined between the tool electrode and the workpiece. The separate power supply unit is adapted to package in its cabinet all principal electrical components required to produce at its output a succession of unidirectional power pulses of a predetermined polarity relative to the tool electrode and the workpiece, the output of the unit being connected and hence the power pulses outgoing from the unit being transmitted to the machining gap by way of an elongated cable or line which must be provided. As a consequence, stray resistance and inductance included in the cable or line impede transmission of the unidirectional electric power pulses and act to cause a considerable loss of power and distortion of pulse waveform transmitted to the machining gap. It has, therefore, been unavoidable for the material removal to be undesirably limited, for the machining efficiency to be unsatisfactorily low and for the entire power unit to become excessively large and bulky in conventional electrical discharge machines.

In the aforementioned copending application, there has been disclosed an improved method of and apparatus for supplying high-frequency electrical discharge machining pulses between a tool electrode and a workpiece across a machining gap flushed with a machining fluid in an electrical discharge machine. The improved method disclosed therein comprises: generating a high-frequency alternating electric power in a high-frequency generator unit disposed remote from the machining gap, transmitting the high-frequency alternating electric power to a region immediately proximal to the machining gap along a feeder having inlet terminals directly leading from the high-frequency generator unit; and rectifying the high-frequency alternating electric power in the proximity of the machining gap to form a succession of pulses of a given polarity relative to the tool electrode and the workpiece, constituting the electrical discharge machining pulses which generally have a frequency of 1 kHz and 5 MHz.

An apparatus or a circuit arrangement for carrying out the method has also be disclosed comprising: unidirectional current conducting means disposed in the proximity of the machining gap and connected to the tool electrode and workpiece via respective conductors of a minimum length; a high-frequency alternating power generator disposed remote from the machining gap for providing a high-frequency alternating power at an output thereof; and a feeder for connecting the generator to the unidirectional current conducting means to allow the electric power produced at the output to be transmitted in the form of the high-frequency alternating electric current to the proximity of the machining gap, the unidirectional current conducting means being adapted to rectify the high-frequency alternating electric power in the proximity of the machining gap to form a succession of pulses of a given polarity relative to the tool electrode and the workpiece, constituting the electrical machining pulses.

The unidirectional current conducting means may be constituted by a half-wave rectifier or full-wave rectifier and the feeder may comprise a feeder line or cable, e.g. a coaxial cable of conventional design adapted to carry high-frequency AC power. Further, a transformer (stepdown) may be provided ahead of the unidirectional current conducting means along the feeder to establish a desired magnitude of the electrical machining pulses applied to the machining gap.

According to the technique disclosed, since the machining power from the generator is transmitted in the form of a high-frequency AC until it reaches the proximity of the machining gap, there is little loss of power and distortion of the voltage or current waveform along the feeder, permitting machining at an increased removal rate with a maximum consumption of electric power which can be transmitted with ease even at a frequency in the megacycle range. In addition, the low loss of power along the feeder renders the generator compact and smaller in size and capacity.

The transformer and the rectifier can be mounted on a portion of the walls of the work vessel or directly on the head, column or bed of the machine carrying the tool electrode or the workpiece. The transformer is advantageously of a small size since the power carried thereby is of a high-frequency. The rectification of the transformed high-frequency by the rectifier in the proximity of the machining gap provides polarized or unidirectional machining power pulses which are applied to the gap without substantial power loss and waveform distortion.

Machining power pulses obtained by rectification of the high-frequency AC power may have an extremely narrow pulse duration $\tau$ on of 1 to 100 microseconds and a pulse interval $\tau$ off of 0.1 to 50 microseconds, both of which can be set at the generator and applied to the machininig gap without power loss. A succession of machining pulses with such short pulse on time or duration $\tau$ on and pulse off-time or interval $\tau$ off are capable of producing finely divided electrical discharges which prevent the workpiece surface from rough material removal and thus enable precision machining. Furthermore, with a discharge pulse repetitively created with a short interval, the machining gap allows a next discharge to take place before its complete deionization from the previous discharge. This effectively avoids misfiring with each individual pulse so that an enhanced discharge repetition rate is achieved and with each individual discharge contributing to material removal with maximum effectiveness, a high-speed and high-efficiency machining process ensues.

The aforementioned copending application has also pointed out that in order to achieve better machining efficiency and stability, it is desirable to periodically or intermittently interrupt the high-frequency electrical pulses so that the machining discharges at the gap take place in the form of intermittently occurring successions of high-frequency elementary discharges. To this end, the high-frequency generator incorporates, in addition to a high-frequency AC oscillator of an output frequency in the range of 1 kHz to 5 MHz, a pulser designed to provide a series of pulses of relatively long ON time Ton and relatively long OFF time Toff and to recurrently interrup therewith with high-frequency AC output. As a result, the output of the generator furnishes successive trains of high-frequency alternating pulses. The successive trains are transmitted along the feeder to the rectifier proximal to the machining gap and thereby converted to successive trains of unidirectional pulses for application across the machining gap. Elementary pulses which constitute each train here may have a pulse duration $\tau$ on = 1 to 100 $\mu$s and a pulse interval $\tau$ off = 0.5 to 50 $\mu$s and, together with the frequency thereof, are defined at the high-frequency AC oscillator. When the rectifier is of half-wave rectification, the pulse duration and interval becomes $\tau$ on = $\tau$ off and when it is of full-wave, the relationship $\tau$ on >> $\tau$ off results. The oscillator may also be adapted to produce an asymmetrical AC which is obtainable, for example, by superimposing a symmetrical AC of the adjustable frequency upon a biasing DC, in which case any desired combinations of the pulse duration and interval having a relation either $\tau$ on > $\tau$ off or $\tau$ on < $\tau$ off may be provided as required in accordance with a particular electrode material combination and machining conditions.

As a consequence, trains of pulses with each train comprising a series of elementary pulses having a pulse duration $\tau$ on and interval $\tau$ off and recurrent at a frequency f are provided at a relatively long ON time Ton and OFF time Toff and recurrent at a frequency F across the machining gap between the tool electrode and the workpiece to permit machining at an increased efficiency. The On time Ton and OFF time Toff may each range between 10 microseconds and 100 milliseconds while the frequency F of the trains may range between 100 Hz and 100 KHz, these train parameters being chosen according to particular machining conditions and settings.

A gap sensor may be provided to monitor the machining state or condition at the gap by responding to one or more of gap variables such as gap voltage, current and impedance on an average basis or an instantaneous basis within each pulse train or between adjacent pulse trains, together with a pulse parameter controller responsive to the gap sensor for controlling one or more of Ton, Toff and F as controllable train parameters. Of course, parameters $\tau$ on, $\tau$ off and/or f of elementary pulses within each train may simultaneously be controlled as desired with an additional controller associated with the high-frequency AC oscillator.

The control of pulse train parameters is such as to decrease the ON time Ton and/or to increase the OFF time Toff and, in other words, to decrease the number of elementary pulses within each train and/or to increase the period in which the elementary pulses are interrupted in each recurring cycle of elementary pulse trains, when the gap sensor indicates worsening or degeneration of the machining state requiring a correction or recovery in response to the gap variables. Thus, discharge-produced machining chips, tar and gases accumulated or excessively remaining in the machining gap are effectively carried away during increased OFF times and decreased ON times to maintain the gap at an optimum stage which allows machining discharges to be created at stability with successive unit pulse trains. It is also desirable to control the average machining current by modifying train ON time and/or OFF time to allow diverse machining operations from high-speed to slow machining or in response to change in the machining area across which the tool electrode and the workpiece are juxtaposed. The high-frequency oscillator is permitted to oscillate when and every time the ON signal is incoming at its input from the pulser.

SUMMARY OF THE INVENTION

The present invention is broadly directed to an improved EDM method and apparatus as discussed in the foregoing and disclosed in the aforementioned copending application and extends the principles set forth therein.

In accordance with the present invention there is provided a method of supplying successive time-spaced trains of discrete elementary pulses to an EDM gap, the elementary pulses being derived at a high-frequency generator disposed remote from the machining gap and transmitted in the form of an unrectified high-frequency AC power to unidirectional current conducting means disposed proximal to the machining gap for rectifying the high-frequency AC power to form the discrete elementary pulses of a given polarity, the unidirectional current conductive means connected to the tool electrode and the workpiece via respective conductors of a minimum length for applying the elementary pulses to the machining gap, the method comprising the controlling the operation of the unidirectional current conducting means to cyclically interrupt the unidirectional elementary pulses to form the successive time-spaced trains thereof.

The aparatus according to the invention comprises a high-frequency generator disposed remote from the machining gap for providing a high-frequency AC power at an output thereof, unidirectional current conducting means disposed proximal to the machining gap for rectifying the high-frequency AC power to form discrete elementary pulses of a given polarity, a feeder connecting the output of the high-frequency generator to the unidirectional current conducting means for transmitting the high-frequency AC power to the unidirectional current conducting means, and control means associated with the unidirectional current conducting means for cyclically interrupting the operation thereof to allow the discrete elementary pulses to be passed in the form of successive time-spaced trains thereof to the machining gap, the unidirectional current conducting means being connected to the tool electrode and the workpiece via respective conductors of a minimum length.

The unidirectional current conducting means is advantageously constituted by a thyristor having a pair of principal electrodes connected to the tool electrode and the workpiece and oriented to establish the desired polarity and control electrodes energized by pulsing means constituting the control means for cyclically interrupting passage of the discrete elementary pulses rectified from the high frequency AC. A gap sensor is preferably provided also and proximal to the machining gap for sensing the discharge condition in the machining gap to act on the pulsing means to control the mode of pulse interruption and generation of the successive time-spaced trains of discrete elementary pulses.

SPECIFIC DESCRIPTION

Figure 1:
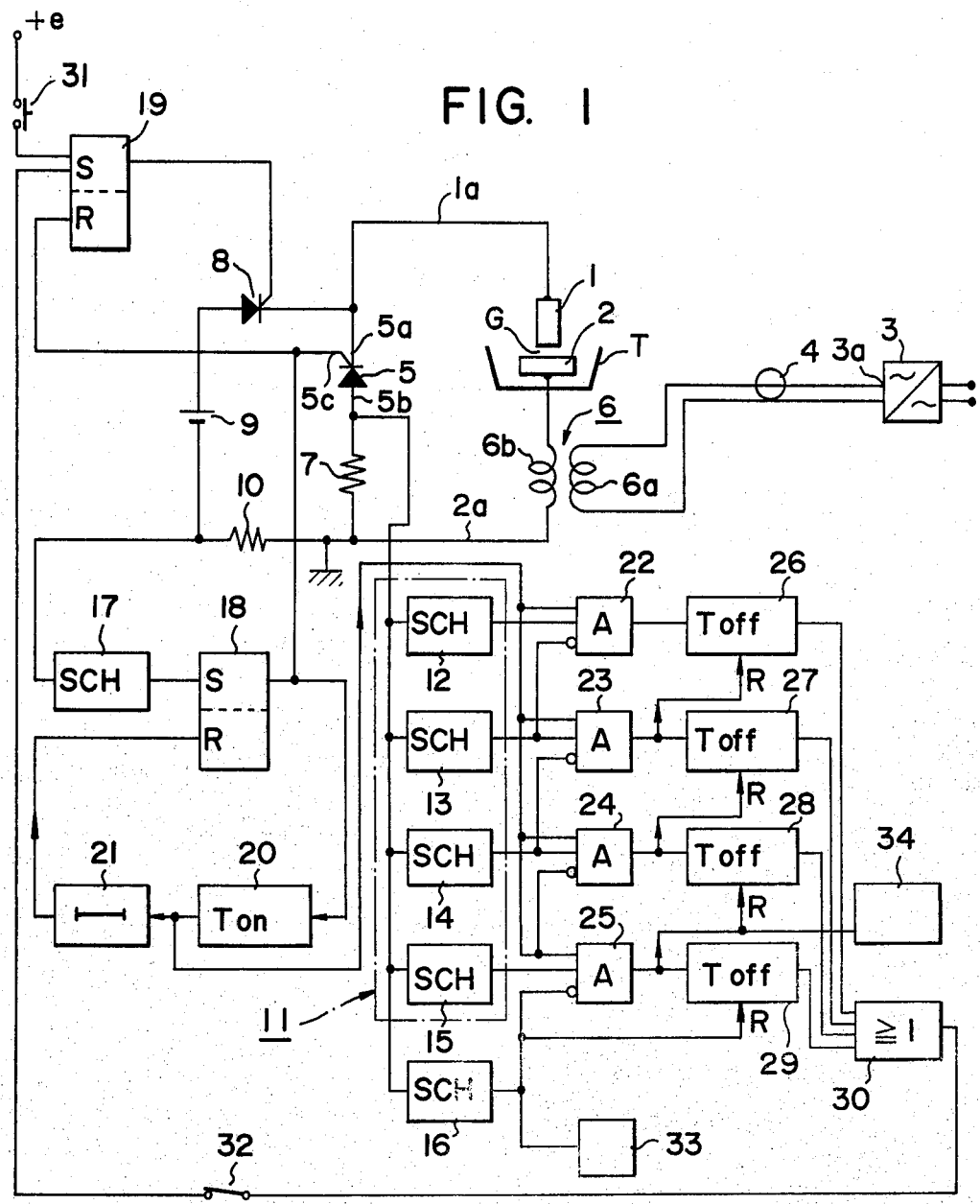
FIG. 1 is a circuit diagram illustrating an EDM power supply for embodying the present invention.

In FIG. 1, a tool electrode 1 is shown juxtaposed with a workpiece 2 to form a machining gap G in a work tank T. The tool electrode 1 may take any of various forms, e.g. tubular or three-dimensional solid forms, depending upon a particular EDM mode to be carried out. In traveling wire or wire-cut electrical discharge machining (TW-EDM or WC-EDM), a wire or the like continuous elongate electrode is commonly utilized. The work tank T is typically mounted upon a work table or base (not shown) and constitutes a part of an electrical discharge machine with the function to serve as a dielectric container or collector in which the machining gap G is defined. Any known dielectric fluid supply (not shown) is provided to deliver the machining liquid to the machining gap G so that the latter is filled and flushed therewith to carry away machining chips, tar and gases therefrom while serving as an EDM medium. During the machining operation, the tool electrode 1 is advanced relative to the workpiece 2 to maintain the gap G spacing therebetween constant by a servomechanism (not shown).

In accordance with an important feature of the present invention, a high-frequency AC generator 3 is disposed remote from the machining gap G and has an output thereof 3a leading via a high-frequency feeder 4, e.g. a coaxial cable, to the proximity of the machining gap G. In the latter region there is disposed unidirectional current conducting means 5, constituted of a thyristor having negative and positive electrode terminals 5a and 5b connected to the tool electrode 1 and the workpiece 2 via respective conductors 1a and 2a of a minimum length. The conductor 2a is shown including a secondary winding 6b of a high-frequency transformer 6 whose primary winding is energized by the high-frequency AC transmitted along the feeder 4 from the generator 3.

The conductor 2a also includes a sensing resistor 7 and a series network of a further thyristor 8, a high-voltage auxiliary voltage source 9 and a current limiting resistor 10 is connected in parallel across the series network of the thyristor 5 and the sensing resistor 7.

Shown at 11 is a gap discharge sensor comprising Schmitt-trigger circuits 12, 13, 14 and 15. Further Schmitt triggers 16 and 17 are provided to detect a gap-short circuiting and gap breakdown, respectively. A pair of RS or flip-flop bistable elements 18 and 19 have respective outputs connected to the respective control electrodes 5c and 8c of the thyristers 5 and 8. The output of the RS bistable element 18 is also applied to a timer 20 which in turn leads to a delay circuit 21 having its output returned to the reset-terminal of the bistable element 18. The set-terminal of the latter is tied to the output of the Schmitt trigger 17.

AND gates 22, 23, 24 and 25 as discriminators are associated at their input sides with the gap discharge sensor circuit 11 and have their respective outputs leading to timers 26, 27, 28 and 29 having different time constants or operating times. An OR gate 30 is fed with the outputs of the timers 26, 27, 28 and 29 and has its output fed to the set terminal of the RS bistable element 19. The latter has the reset-terminal connected to the set-terminal of the RS bistable element 18. A further set-terminal of the RS bistable element 19 is energized by the voltage terminal +e via an operation-start push button switch 31. A further switch 32 is connected between the output of the OR gate 30 and the set terminal of the RS bistable element 19 and is normally closed and opened at the end of a machining operation. An emergency unit 33, responsive to the dead short-circuiting or any other trouble of the machine, and an electrode reciprocation unit 34 associated with the servomechanism are also shown and disposed, together with the high-frequency generator 3, remote from the machining gap G.

The generator 3 provides an AC power of a high frequency which ranges preferably between 1 kHz and 5 MHz that generally corresponds to a frequency f or repetition rate of elementary machining pulses applied across the machining gap G. The high-frequency AC power produced by the generator 3 at a location remote from the machining gap G on the work tank T is transmitted by way of the feeder 4 which terminates at the primary winding 6a of the transformer 6. The latter serves to step down the voltage level of the high-frequency output of the generator 3 and to set the peak pulse current at a desired value in the close proximity of the machining gap G. The polarity of the pulses applied across the machining gap given by the orientation of the rectifier 5 is, as shown, such as to make the electrode 1 anodic and the workpiece 2 and this may be reversed according to the particular electrode material and machining conditions or settings to be selected.

Since the machining power from the generator 6 is transmitted in the form of a high-frequency AC until it reaches the proximity of the machining gap G, there is little loss of power and little distortion of the voltage or current waveform along the feeder 4, permitting machining at a high removal rate with a maximum electric power which can be transmitted with ease even at a frequency in the megacycle range. In addition, the low loss of power along the feeder 4 permits the generator 3 to be compact and smaller in size and capacity.

The transformer 6 and the thyristor 5 can be mounted on a portion of the walls of the work tank T or directly on the head, column or bed of the machine carrying the tool electrode 1 or the workpiece 2. The transformer 6 is advantageously of a small size since the power carried thereby is of a high frequency. The rectification of the transformed high-frequency by the thyristor 5 in the proximity of the machining gap G provides polarized or unidirectional machining power pulses which are applied to the gap G without substantial power loss or waveform distortion.

Machining power pulses obtained by rectification of the high-frequency AC power may have an extremely narrow pulse duration τon of 1 to 100 microseconds and a pulse interval τoff of 0.5 to 50 microseconds, both of which can be set at the generator 3 and applied to the machining gap G without power loss. A succession of machining pulses with such short on and off are capable of producing finely divided electrical discharges which prevent the workpiece surface from rough material removal and thus enable precision machining. Furthermore, with a discharge pulse repetitively created with a short interval, the machining gap G allows a next discharge to take place before it completes deionization from the previous discharge. This effectively avoids misfiring with each individual pulse so that an enhanced discharge repetition rate is achieved and with each individual discharge contributing to material removal with maximum effectiveness, a high-speed and high-efficiency machining process ensues.

In the operation of the circuit arrangement shown in FIG. 1, the switch 32 is initially open so that RS bistable elements 18 and 19 are held both in a reset state and the thyristors 5 and 8 are held nonconductive.

For initiating a given EDM operation, the tool electrode 1 and the workpiece 2 are set at their machining start position and various machine components not shown are actuated, whereupon the switch 32 is closed. The delivery of the machining liquid to the gap G commences and the generator 3 is activated to supply the high-frequency AC power to the primary winding 6a of the transformer 6 along the feeder 4.

Then, depressing the start push button switch 31 causes the RS bistable element 19 to turn to its set state so that the thyristor 8 is turned to conduction. This allows the transformer 6 to develop an induction voltage $V_A$ in a series circuit connecting the auxiliary voltage source 9 with the tool electrode 1 and the workpiece 2 and causes the sum of the auxiliary voltage $V_D$ of the source 9 and the induction voltage $V_A$ superimposed one upon the other to develop across the machining gap G. This sum or peak voltage ($V_D + V_A$) is set at a value much higher than the gap breakdown voltage and acts to initiate the electrical discharge across the machining gap G. The breakdown discharge at this stage is not self-sustaining because of a high resistance value of the current limiting resistor 10 inserted in this series circuit.

The gap breakdown or the initiation of the electrical discharge is sensed by the Schmitt trigger 17 and results in the turning of the RS bistable element 18 to its set state. This causes the thyristor 5 to turn to conduction which in sequence turns the bistable element 19 back to its reset state and at the same time brings the timer 20 into operation. The thyristor 5 turned to conduction now establishes a discharge path including the secondary winding 6b of the transformer 6 and the resistor 7 in series with the tool electrode 1 and the workpiece 2. The electromotive force in this discharge circuit is served by only a half wave of the induction voltage $V_A$ of the transformer 6 and, due to a small resistance value of the resistor 10, allows development of a sufficient machining current level. In the meantime, the thyristor 8 is turned off and the auxiliary power supply 8 is cut off from the discharge circuit as soon as the sum voltage $V_D + V_A$ becomes nil.

Figure 2:
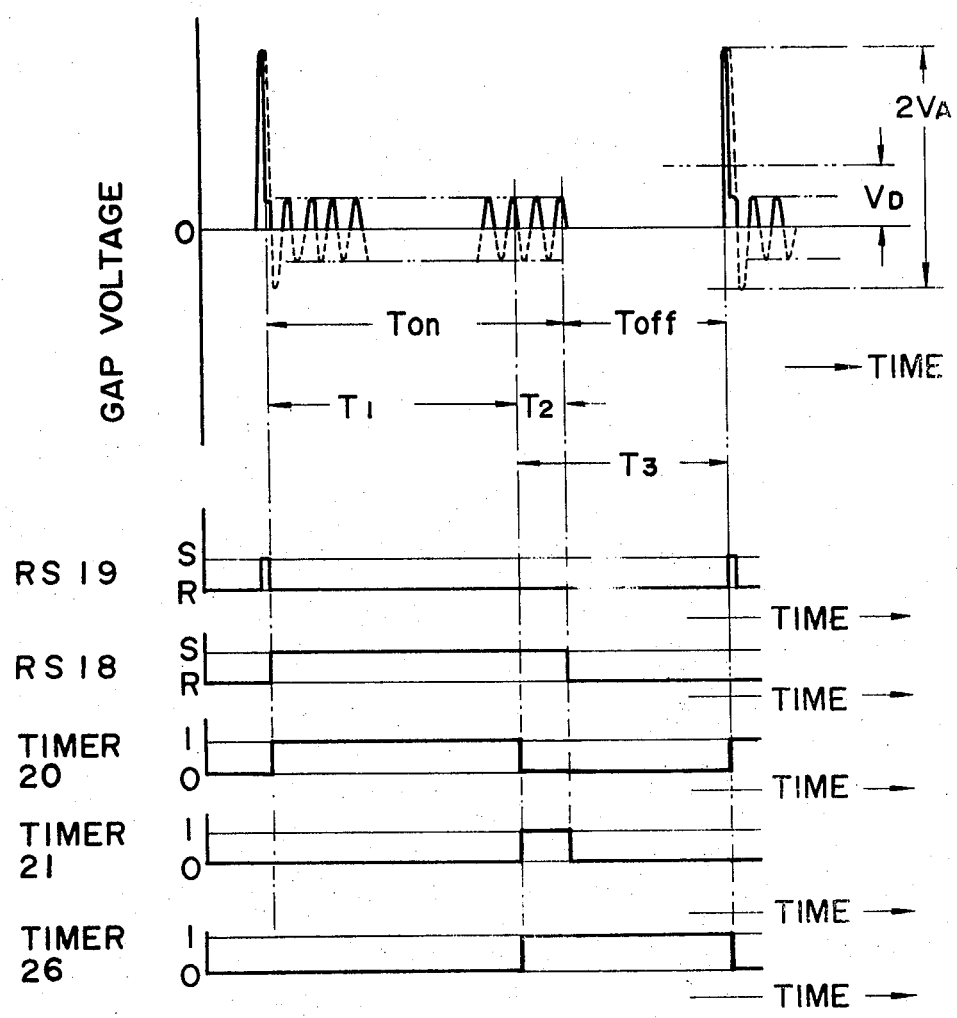
FIG. 2 is a time chart and waveform diagram illustrating the operation of the circuitry of FIG. 1.

The timer 20 is preset to establish a time period T1, upon lapse of which it brings the delay circuit or timer 21 into operation. The delay timer has a time period T2 upon lapse of which it triggers the Rs element 18 to its reset state. Accordingly, the positive halfwave component of the output voltage $V_A$ of the transformer 6 remains supplied in the form of a succession of rectified pulses to the machining gap G for the sum time period or duration T1+T2. Here, as shown in FIG. 2, the time period T1 is selected to correspond to a greater number of cycles of the high frequency AC while the time period T2 is set to correspond to a few number of cycles of the latter.

The Schmitt triggers 12 to 15 constituting the discharge state or characteristic sensor 11 and the Schmitt trigger 16 have triggering levels E12 to E15, and a triggering level E16, respectively, where E12<E13<E14<E15<<E16. The peak voltage Ep sensed at the resistor 7 is set to indicate the occurrence of an optimum discharge characteristic at the machining gap G when E13≦Ep≦E14. When Ep<E13 the discharge current is too small or unsatisfactory whereas when Ep≧E14 the discharge current is excessive.

Thus, when optimum gap discharges continue to occur, the Schmitt triggers 12 and 13 will provide outputs while the Schmitt triggers 14 and 15 remain deactuated. Consequently, when the timer 20 issues the output pulse, the AND gate 23 is chosen to transmit the output of the Schmitt trigger 13 to selectively drive the timer 27 into operation. When the discharge current is unsatisfactorily small, the AND gate 22 is enabled to transmit the output of the Schmitt trigger 12 to selectively drive the timer 26 into operation. When the discharge current is excessive but lies to meet the relation E14≦Ep<E15, the timer 28 is likewise selected. When E15≦Ep<E16, the timer 29 operates. Therefore, there results the selective activation of one of the plural timers 26 to 29 to establish the OFF time Toff depending upon the particular level of the gap discharge current.

When the RS bistable element 18 is reset, the thyristor 5 has its control electrode 5c deenergized so that the development of the subsequent first negative half-wave of the high-frequency AC voltage of the transformer 6 across its principal electrodes 5a and 5b turns it to nonconduction, thus terminating the duration Ton of a succession of the discrete elementary pulses.

The operating time periods T26 to T29 of timers 26 to 29 are set to meet the relation: T26<T27<T28<T29 and variably establish the train interval Toff between the successive trains of discrete elementary machining pulses depending upon the particular discharge state at the machining gap G.

Upon expiration of its selected operating period T26, T27, T28 or T29, the timer 26, 27, 28 or 29 provides a short output pulse which is fed via the OR gate 30 to the RS bistable element 19 to bring it back into the set condition. This permits the thyristor 8 to turn to conduction; the cycle repeats to advance the EDM operation.

In the arrangement illustrated, the electrode reciprocating unit 34 is also shown energizable responsive to the discharge state sensor 11 especially when an excessively low impedance condition prevails at the machining gap G. When the gap current is so high as to cause the triggering of the Schmitt circuit 15, the second output of the AND gate 25 is used to activate the unit 34 thereby causing the tool electrode 1 to be reciprocated or cyclically retracted from the machining position as long as the condition persists or for a predetermined time duration. Further, when the machining current is so high as to cause the triggering of the Schmitt circuit 16, the emergency unit 33 is also activated to shut off the source power.

In this embodiment, transformer 3, thyristors 5 and 8, discharge state sensor unit 11 and components associated therewith are preferably all disposed in the close proximity of the machining gap G at which machining discharges are produced. This effectively eliminates the undesirable distortion of the pulse waveform and renders the pulse characteristics substantially immune from the external noises. Accordingly, high-precision gap ascertainment and pulse control operations are also provided.

There is thus provided an improved high-frequency power feeder circuitry as well as power supply method for supplying to an EDM gap machining pulses in the form of successive trains of discrete elementary pulses, which circuitry and method assuring better machining results while conveniently rendering the entire power supply unit compact and simplified.

What is claimed is:

1. A method of supplying to an EDM gap formed between a tool electrode and a workpiece electrode, a sequence of successive and time-spaced trains of discrete and time-spaced elementary machining pulses of a predetermined polarity relative to said tool and workpiece electrodes, said method comprising the steps of:
    generating a high-frequency AC power of a frequency equal to the frequency of said discrete and time-spaced elementary machining pulses in each of said successive trains with a high-frequency AC generator unit disposed remote from said machining gap;
    transmitting said generated high-frequency AC power in an original and unrectified AC form along a feeder to the direct proximity of said machining gap; and
    in said direct proximity of the machining gap, generally periodically interrupting said transmitted high-frequency AC power at a frequency lower than the first-mentioned frequency and simultaneously rectifying the uninterrupted portion of said transmitted high-frequency AC power, thereby producing said sequence of the successive and time-spaced trains of discrete and time-spaced elementary machining pulses of said predetermined polarity and permitting said sequence to be applied directly across said EDM gap, with the distance between said direct proximity from said gap such that there is little loss of power due to stray resistance and inductance and the pulse waveform across said gap is substantially free from distortion.

2. The method defined in claim 1 wherein said frequency of the high-frequency AC power is in the range between 1 kHz and 5 MHz.

3. The method defined in claim 2 wherein each of said uninterrupted portions of the transmitted high-frequency AC power has a duration in the range between 10 microseconds and 100 milliseconds.

4. A method as defined in claim 1, further comprising the steps of sensing gap discharge characteristic resulting from the application of said discrete and time-spaced elementary machining pulses to said EDM gap to provide a control signal; and with said control signal, modifying the mode of said interruption of the transmitted high-frequency AC power.

5. The method defined in claim 4 wherein said interruption is modified by controlling the duration of the interrupted portions of said transmitted high-frequency AC power.

6. The method defined in claim 4 wherein said interruption is modified by controlling the duration of the uninterrupted portions of said transmitted high-frequency AC power.

7. The method defined in claim 4 wherein said step of sensing the gap discharge characteristic is carried out at a final period of the duration of each train of said discrete and time-spaced elementary machining pulses.

8. A method as defined in claim 1, further comprising the step of superimposing a high-voltage, low-current pulse upon a discrete elementary machining pulse in an initial period of each of said trains.

9. A method as defined in claim 1, further comprising the step of transforming, in said direct proximity of the machining gap, said transmitted high-frequency AC power prior to rectification thereof to establish a desired voltage level of said discrete and time-spaced elementary machining pulses in each of said trains.

10. A circuit arrangement for supplying to an EDM gap formed between a tool electrode and a workpiece electrode, a sequence of successive and time-spaced trains of discrete and time-spaced elementary machining pulses of a predetermined polarity relative to said tool and workpiece electrodes, said arrangment comprising:
    a high-frequency AC generator disposed remote from said EDM gap for providing a high-frequency AC power of a high frequency equal to the frequency of said discrete and time-spaced elementary machining pulses
    feeder means for transmitting said generated high-frequency AC power in an original and unrectified AC form to the direct proximity of said EDM gap; and
    unidirectional current conducting and switching means disposed in said direct proximity of the EDM gap and connected to said tool and workpiece electrodes with respective conductors of a minimum length and responsive to a sequence of successive and time-spaced switching control signals for generally periodically interrupting said transmitted high-frequency AC power and simultaneously rectifying the uninterrupted portions of said transmitted high-frequency AC power, thereby producing said sequence of the successive and time-spaced trains of discrete and time-spaced elementary machining pulses of said predetermined polarity and permitting said sequence to be applied directly across said EDM gap, with dimensioning the conducting means and the distance of said direct proximity from said gap such that there is little loss of power due to stray resistance and inductance of said conducting means and the pulse waveform across said gap is substantially free from distortion.

11. A circuit arrangement as defined in claim 10, further comprising a high-frequency transformer disposed in said direct proximity to the EDM gap and connected ahead of said unidirectional current conducting and switching means for transforming said high-frequency AC power transmitted to said direct proximity of the EDM gap but prior to the rectification thereof to establish a desired voltage level of said discrete and time-spaced elementary machining pulses in each train.

12. The circuit arrangement defined in claim 10 wherein said feeder means comprises a coaxial cable.

13. A circuit arrangement as defined in claim 10, further comprising discharge state sensing means disposed in said direct proximity of the EDM gap for sensing gap discharge characteristic resulting from the application of said discrete elementary machining pulses to said EDM gap to provide a control signal; and control means disposed in said direct proximity of the EDM gap for modifying with said control signal the mode of the interruption of said transmitted high-frequency AC power.

14. The circuit arrangement defined in claim 13 wherein said discharge state sensing means includes timing means for timing the sensing of said gap discharge characteristic at a final period of the duration of each of said trains.

15. A circuit arrangement defined in claim 10, further comprising circuit means disposed in said direct proximity of the EDM gap for superimposing a high-voltage, low-current pulse upon an elementary machining pulse at an initial period of the duration of each of said trains.

16. The method defined in claim 1 or claim 2 wherein said frequency at which said transmitted high-frequency AC power is interrupted is in the range between 100 Hz and 100 kHz.

* * * * *